(12) United States Patent
Tomiyama et al.

(10) Patent No.: US 11,594,924 B2
(45) Date of Patent: Feb. 28, 2023

(54) OUTER ROTOR TYPE MOTOR HAVING ASSEMBLY MECHANISM IN WHICH AXIAL, PERPENDICULARITY BETWEEN A STATOR UNIT AND A ROTOR UNIT IS MAINTAINED

(71) Applicant: SHINANO KENSHI KABUSHIKI KAISHA, Nagano (JP)

(72) Inventors: Shou Tomiyama, Nagano (JP); Makoto Aida, Nagano (JP); Mario Fiorucci, Zurich (CH); Andreas Furrer, Zurich (CH); Stefan Wildhaber, Sankt Gallen (CH)

(73) Assignee: SHINANO KENSHI KABUSHIKI KAISHA, Nagano (JP)

(*) Notice: Subject to any disclaimer, the term of this patent is extended or adjusted under 35 U.S.C. 154(b) by 92 days.

(21) Appl. No.: 17/198,621

(22) Filed: Mar. 11, 2021

(65) Prior Publication Data

US 2021/0328467 A1 Oct. 21, 2021

(30) Foreign Application Priority Data

Apr. 17, 2020 (JP) .............................. JP2020-074136

(51) Int. Cl.
*H02K 1/2786* (2022.01)
*H02K 3/34* (2006.01)
*H02K 3/50* (2006.01)
*H02K 11/33* (2016.01)

(52) U.S. Cl.
CPC ............. *H02K 1/2786* (2013.01); *H02K 3/34* (2013.01); *H02K 3/50* (2013.01); *H02K 11/33* (2016.01)

(58) Field of Classification Search
CPC .. H02K 1/2786; H02K 1/2791; H02K 1/2787; H02K 1/2789; H02K 1/279; H02K 1/27915; H02K 1/2792; H02K 3/34; H02K 3/345; H02K 3/50; H02K 5/165; H02K 5/1677; H02K 5/1737; H02K 1/82; H02K 3/32; H02K 3/325; H02K 7/086;
(Continued)

(56) References Cited

U.S. PATENT DOCUMENTS

2006/0103253 A1* 5/2006 Shiga .................. H02K 1/2786
310/43

FOREIGN PATENT DOCUMENTS

| JP | H10-143989 | 5/1998 |
| JP | H11-18356 | 1/1999 |
| JP | 2001298893 | 10/2001 |

(Continued)

OTHER PUBLICATIONS

Noguchi, Machine Translation of JP11018356, Jan. 1999 (Year: 1999).*

(Continued)

*Primary Examiner* — Eric Johnson
(74) *Attorney, Agent, or Firm* — Stephen J. Weyer, Esq.; Stites & Harbison, PLLC

(57) ABSTRACT

A stator core is integrally moulded with an insulator employing an insulating resin material, together with a fixed shaft which is inserted into a centre hole in a core back portion, and the stator core and a motor circuit board are assembled as a single piece by mating a plurality of circuit board insertion pieces protruding on an axial end of the insulator on the opposite side to an output end with circuit board insertion holes.

2 Claims, 6 Drawing Sheets

(58) Field of Classification Search
CPC ........ H02K 7/088; H02K 11/30; H02K 11/33; H02K 21/22
See application file for complete search history.

(56) References Cited

FOREIGN PATENT DOCUMENTS

| | | |
|---|---|---|
| JP | 2003-47222 | 2/2003 |
| JP | 2009148103 A * | 7/2009 |
| JP | 2009-254216 | 10/2009 |
| JP | 2009-303473 | 12/2009 |
| JP | 2010-187501 | 8/2010 |
| JP | 2014018068 | 1/2014 |

OTHER PUBLICATIONS

Notice of Refusal (Office Action) dated Dec. 21, 2021 in Japanese Application No. 2020-074136.

* cited by examiner

FIG.5C
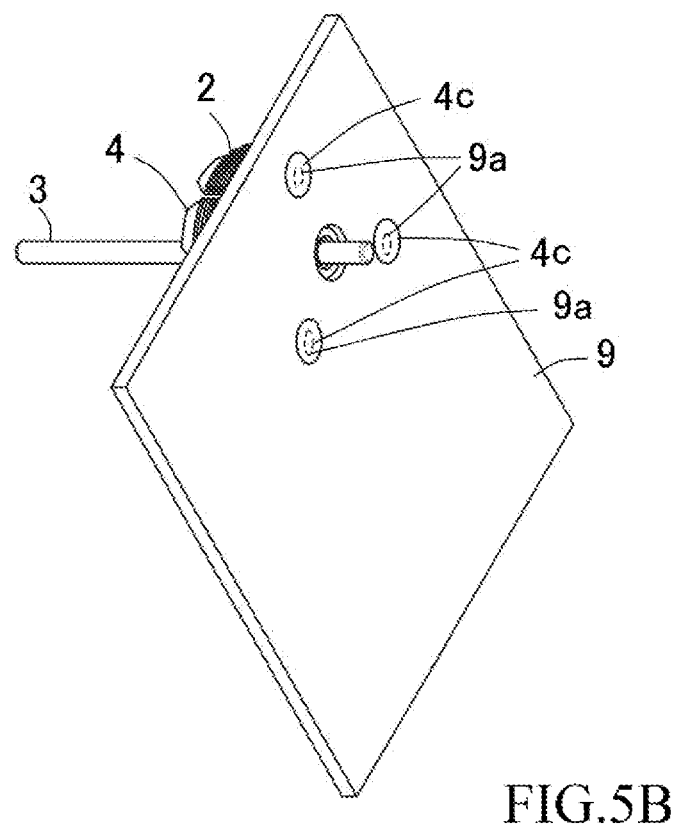
FIG.5A
FIG.5B
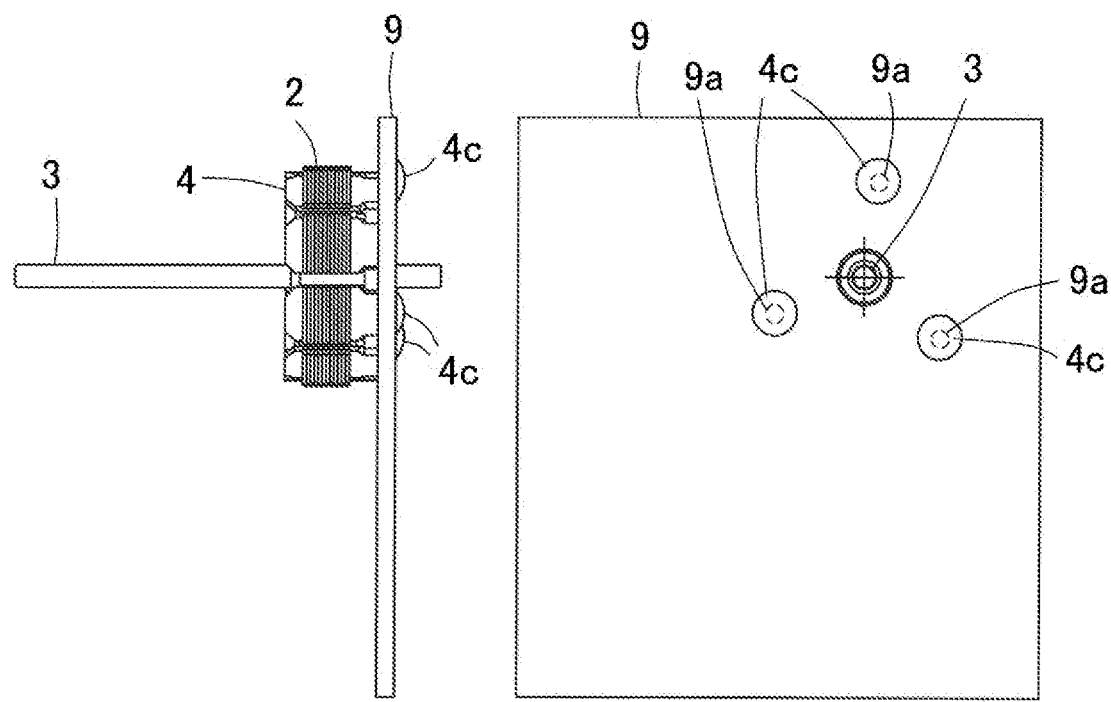

OUTER ROTOR TYPE MOTOR HAVING ASSEMBLY MECHANISM IN WHICH AXIAL, PERPENDICULARITY BETWEEN A STATOR UNIT AND A ROTOR UNIT IS MAINTAINED

CROSS-REFERENCE TO RELATED APPLICATION

This application is based upon and claims the benefit of priority of the prior Japanese Patent Application No. 2020-074136, filed on Apr. 17, 2020, and the entire contents of which are incorporated herein by reference.

TECHNICAL FIELD

The present invention relates to an outer rotor type motor which is used as a drive source in an electric motor such as a damper actuator for air conditioning in a building, for example.

BACKGROUND ART

In an outer rotor type DC brushless motor, a metal attachment plate is supported by a metal bearing housing made of brass or the like, for example, and a circuit board is assembled as a single piece with said metal attachment plate. An oil-containing bearing is assembled inside the bearing housing, and a rotor shaft is rotatably supported by the oil-containing bearing.

One end of the rotor shaft is joined as a single piece to a rotor hub that holds a rotor yoke. A metal component made of brass or the like is used for the rotor hub, and said rotor hub is swaged with the cup-shaped rotor yoke and assembled as a single piece therewith. Furthermore, a metal motor gear wheel is press-fitted to another end (output end) of the rotor shaft.

A stator is assembled as a single piece with the bearing housing. Specifically, an annular core back portion of a stator core is press-fitted and bonded to the outer circumference of the bearing housing and assembled therewith. Furthermore, a coil is wound, with an insulator interposed, on pole teeth extending radially outside of the core back portion. Magnetic flux action surfaces constituted by tooth tips of the pole teeth are assembled in such a way as to face an annular rotor magnet provided on the inner circumference of the rotor yoke.

In order to maintain axial perpendicularity of the rotor shaft in the abovementioned motor, the stator core is fixed to a member having high rigidity such as a metal motor case or bearing housing.

Furthermore, a coil lead which leads out from a coil wound on the stator pole teeth is connected to a circuit board for energization control, or a sensor board such as a Hall IC is provided, and an electrical wiring connection with a control board of a higher-order device is made from the circuit board or the sensor board by means of an external connection terminal.

Metal components are used for the bearing housing and the bearing, which are constituent components on the stator side of an outer rotor type motor, and metal components are also used for the rotor shaft and the rotor yoke, etc., which are constituent components on the rotor side that are rotatably supported by the bearing, the rotor hub and the rotor shaft being assembled as a single piece by means of press-fitting, etc. (see Patent Document 1: JP 2001-298893 A, and Patent Document 2: JP 2014-18068 A).

SUMMARY OF INVENTION

Technical Problem

In the abovementioned motor, however, an arrangement of multiple boards including the circuit board, etc. on the motor side and a control board on a mounted device side, and wiring connections are required, so there are a large number of components such as the bearing housing for fixing the stator core and a motor case, and the production cost increases.

In order to reduce the cost price, it would be feasible to reduce the number of components and reduce the cost by integrally moulding the rotor shaft and the stator core by means of insert-moulding and mounting the stator core on a centralized circuit board. In this case, using a resin to form the motor components brings the following concerns.

(1) There is a risk of a reduction in axial perpendicularity of the stator core and the rotor shaft, causing a drop in motor performance.

(2) There is a risk of a reduction in axial perpendicularity of the stator core and a circuit board, causing a drop in motor performance.

Solution to Problem

The present invention has been devised in order to solve the abovementioned problems, and the objective thereof lies in providing an outer rotor type motor which makes it possible to keep processing costs down for motor components, and reduce the assembly workload by reducing the number of components, while also making it possible to maintain motor performance without a reduction in axial perpendicularity of a stator core and a rotor shaft or axial perpendicularity of the stator core and a circuit board.

In order to solve the abovementioned problems, the present invention comprises at least the following configuration.

An outer rotor type motor in which a rotor is rotatably assembled radially outside of a stator, said outer rotor type motor being characterized in that it comprises: a stator unit having a stator core comprising a plurality of pole teeth protruding radially outside of a core back portion formed in an annular shape, an insulator with which a fixed shaft inserted into a centre hole in the core back portion is integrally moulded by means of a first resin material covering the stator core, and a circuit board having the stator core assembled therewith with the insulator interposed, and being electrically connected to a magnet wire wound on the pole teeth with the insulator interposed; and a rotor unit in which an annular rotor magnet is provided on an inner circumferential surface of the rotor yoke formed into a cup shape, integrally moulded with a rotor hub comprising at least a second resin material, and the stator core is assembled as a single piece with the circuit board by mating a plurality of circuit board insertion pieces protruding on an axial end of the insulator on the opposite side to an output end with circuit board insertion holes, and the stator unit and the rotor unit are assembled in such a way that the fixed shaft is inserted into a cylindrical hole in the rotor hub and the rotor magnet and the pole teeth are facing, said rotor unit being assembled in such a way as to be slidable and rotatable about the fixed shaft.

By virtue of the abovementioned configuration, it is possible to reduce the number of components as far as possible and to reduce production costs by employing a resin to form the constituent components of a motor in which metal components are normally used for a bearing, a bearing housing, an attachment plate, and a motor gear wheel, etc.

Furthermore, it is possible to maintain motor performance without a reduction in axial perpendicularity of the fixed shaft with which the stator core and the rotor unit are assembled, by integrally moulding the fixed shaft inserted into the centre hole in the core back portion with the insulator which is a first resin material covering the stator core.

It is possible to maintain motor performance without a reduction in axial perpendicularity of the stator core and the circuit board by assembling the stator core as a single piece with the circuit board, by mating the plurality of circuit board insertion pieces protruding on the axial end of the insulator on the opposite side to the output end with the circuit board insertion holes.

Stepped portions which are inserted through the circuit board insertion holes in the circuit board and butt against an insertion surface side, and circuit board fixing portions whereof tip end portions extending up to the opposite surface side are fixed may be formed on the circuit board insertion pieces.

As a result, a height position of the stator core in relation to the circuit board is uniformly determined as a result of the plurality of circuit board insertion pieces on the insulator being inserted into the circuit board insertion holes and the stepped portions butting against the insertion surface, and the stator core and the circuit board are positioned and assembled by fixing the tip end portions on the opposite surface side. The axial perpendicularity of the stator core and the circuit board is therefore maintained and the ease of assembly is also improved.

The circuit board insertion pieces may be provided on the insulator correspondingly with the pole teeth of the stator core, and support legs which abut the circuit board and provide support may be provided correspondingly with the pole teeth between the circuit board insertion pieces.

As a result, the circuit board insertion pieces are provided correspondingly with the pole teeth of the stator core, so the stator core can be assembled in parallel while maintaining axial perpendicularity in relation to the circuit board, and when the support legs which abut the circuit board and provide support are provided correspondingly with the pole teeth between the circuit board insertion pieces, it is possible to stabilize the assembly attitude of the stator core in relation to the circuit board.

Advantageous Effects of Invention

It is possible to provide an outer rotor type motor which makes it possible to keep processing costs down for motor components, and reduce the assembly workload by reducing the number of components, while also making it possible to maintain motor performance without a reduction in axial perpendicularity of a fixed shaft with which a stator core and a rotor unit are assembled and without a reduction in axial perpendicularity of the stator core and a circuit board.

BRIEF DESCRIPTION OF THE DRAWINGS

FIG. 5A-C are a front view, a right-side view and an oblique view showing a state of assembly of the stator unit and a circuit board.

DESCRIPTION OF EMBODIMENTS

An example of an outer rotor type motor will be described below with reference to the appended drawings. An outer rotor type motor refers to a motor in which a rotor is rotatably assembled on a radial outer side of a stator, and a gear wheel is provided on an output shaft of the rotor.

Figure 1:
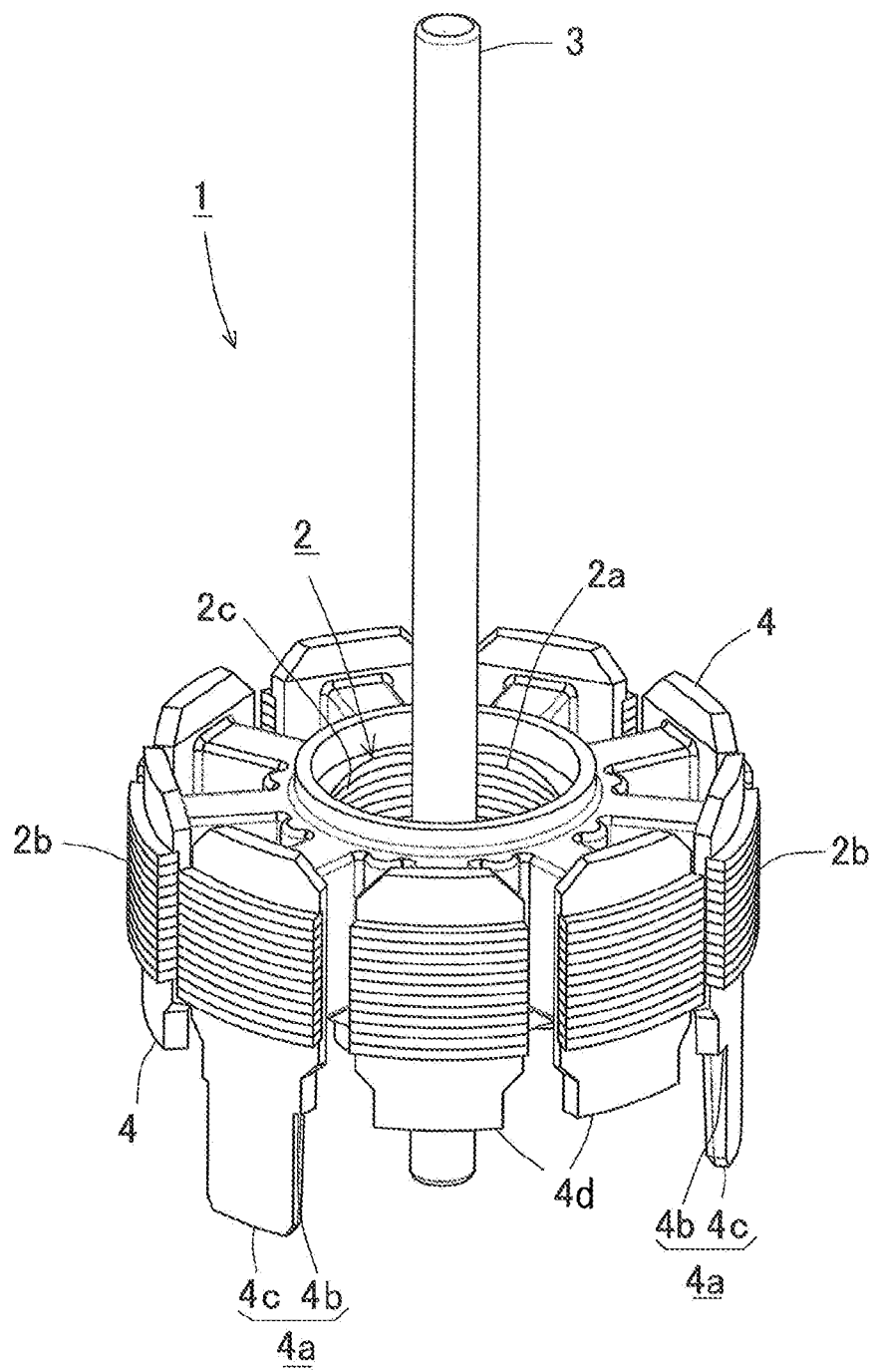
FIG. 1 is an oblique view of a stator unit.

In FIG. 1, a stator unit 1 comprises a stator core 2 having pole teeth 2b protruding radially outside of a core back portion 2a formed in an annular shape. A fixed shaft 3 is inserted into a centre hole 2c in the core back portion 2a of the stator core 2 and insert-moulded by means of a first resin material (an insulating resin material, e.g., PBT: polybutylene terephthalate resin) to form the stator unit 1. Specifically, the periphery of the core back portion 2a and the pole teeth 2b is covered by means of an insulator 4, and the fixed shaft 3 is rendered as a single piece with the insulator 4. As will be described later, the fixed shaft 3 constitutes a rotation centre of a rotor unit 5 and renders the rotor shaft as a fixed shaft.

Figure 4:
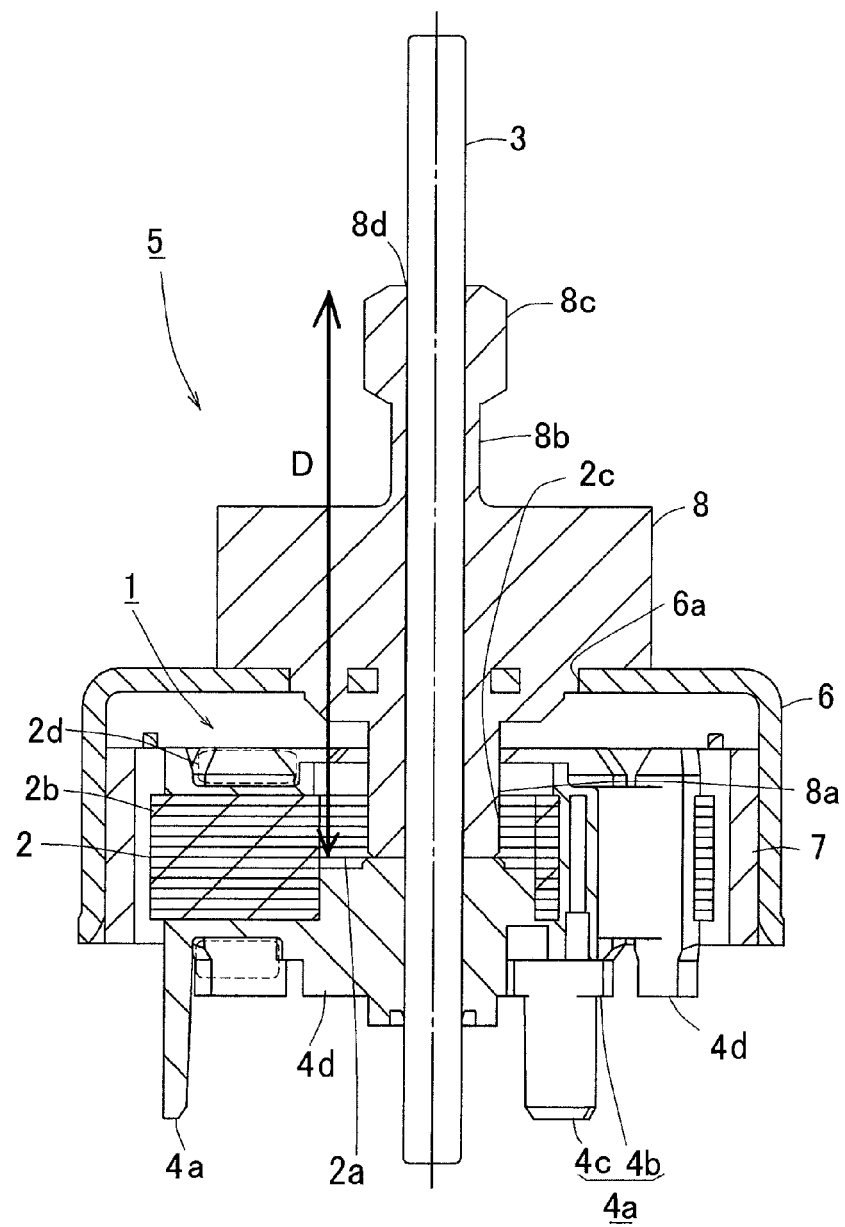
FIG. 4 is a view in axial section of the outer rotor type motor of FIG. 3.

As shown in FIG. 4, the centre hole 2c in the core back portion 2a on one axial end side of the stator core 2 is closed off by means of the insulator 4 joined to the fixed shaft 3. The stator core 2 and the fixed shaft 3 are thus insert-moulded and the centre hole 2c in the core back portion 2a is closed off by means of the insulator 4, so there is no need for an operation to assemble the stator core 2 with a bearing holder, etc., as would be the case conventionally, and since the periphery of the core back portion 2a and the pole teeth 2b is covered by means of the insulator 4, there is no need either for an operation to assemble the insulator 4 with the stator core 2 afterwards, and the ease of assembly is also improved by reducing the number of components.

Furthermore, the stator core 2 is insert-moulded by means of an insulating resin material together with the fixed shaft 3, and assembled as a single piece while covered by the insulator 4. The axial perpendicularity of the fixed shaft 3 and the stator core 2 which have been rendered as a single piece by means of insert-moulding is therefore maintained. A magnet wire 2d is wound onto the pole teeth 2b of the stator core 2 which is covered by the insulator 4, and the stator unit 1 is assembled. The stator core 2 is thus integrally moulded with the insulator 4 employing the insulating resin material, together with the fixed shaft 3 which has been inserted into the centre hole 2c in the core back portion 2a, and as a result it is possible to maintain motor performance without a reduction in axial perpendicularity of the fixed shaft 3 with which the stator core 2 and the rotor unit 5 are assembled.

Furthermore, as shown in FIG. 1, the insulator 4 that covers each of the pole teeth 2b of the stator core 2 has end portions on the opposite side to the output side which are inserted into circuit board insertion holes 9a in a circuit board 9 (see FIGS. 5B and C), and circuit board insertion pieces 4a which are welded at a tip end are arranged at equal angles in multiple locations (at least three locations). Stepped portions 4b which butt against the circuit board 9, and welding portions 4c (circuit board fixing portions) which are inserted into the circuit board insertion holes 9a and are welded while extending as far as the opposite surface of the circuit board 9 are respectively formed on each of the circuit board insertion pieces 4a. The magnet wire 2d which is wound on the pole teeth 2b of the stator core 2 with the insulator 4 interposed is electrically connected to a circuit board terminal of the circuit board 9 (see FIG. 5) which will be described later.

It is thus possible to maintain motor performance without a reduction in axial perpendicularity of the stator core 2 and the circuit board 9 by assembling the stator core 2 as a single piece with the circuit board 9, by mating the plurality of circuit board insertion pieces 4a protruding on the axial end of the insulator 4 on the opposite side to the output end with the circuit board insertion holes 9a. Furthermore, a height position of the stator core 2 in relation to the circuit board 9 is uniformly determined as a result of the plurality of circuit board insertion pieces 4a on the insulator 4 being inserted into the circuit board insertion holes 9a and the stepped portions 4b butting against the insertion surface, and the stator core 2 and the circuit board 9 are positioned and assembled by welding the welding portions 4c on the tip end side on the opposite surface side. It should be noted that the circuit board fixing portions are not limited to the welding portions 4c and may employ another configuration, for example, a snap-fit engagement or screw-fixing, or else adhesive fixing or the like may be used. Furthermore, the circuit board insertion pieces 4a which are provided in multiple locations on the insulator 4 need not necessarily be arranged at equal angles.

As shown in FIG. 5A-C, the welding portions 4c extend as far as the surface of the circuit board 9 opposite to a motor mounting surface, and tip ends of the welding portions 4c protruding from the circuit board 9 are welded. In the case of a 9-slot stator core 2, for example, the circuit board insertion pieces 4a are provided in at least three locations, and support legs 4d which abut the circuit board surface and provide support are provided in the remaining six locations (see FIG. 1 and FIG. 4). Moreover, the circuit board insertion pieces 4a of the insulator 4 covering the stator core 2 may equally be provided correspondingly with all of the pole teeth 2b.

As a result, the circuit board insertion pieces 4a are provided at equal intervals correspondingly with the pole teeth 2b of the stator core 2, so the stator core 2 can be assembled in parallel while maintaining axial perpendicularity in relation to the circuit board 9, and when the support legs 4d which abut the circuit board 9 and provide support are provided correspondingly with the pole teeth 2b between the circuit board insertion pieces 4a, it is possible to stabilize the assembly attitude of the stator core 2 in relation to the circuit board 9.

Figure 2:
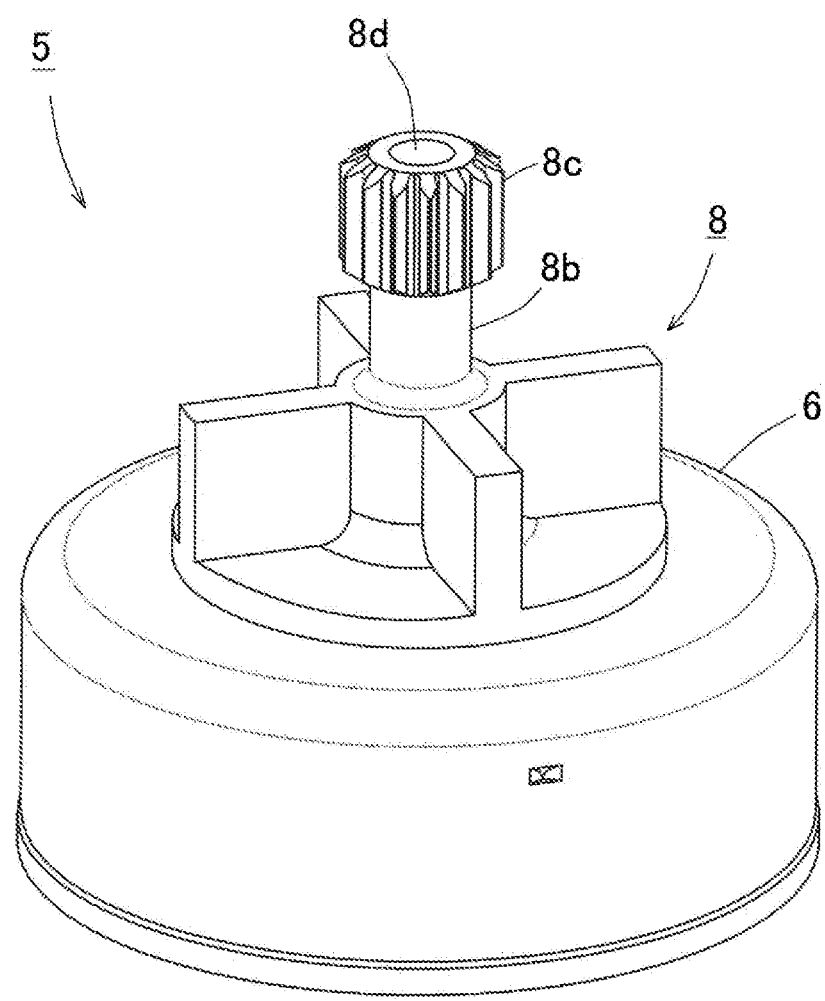
FIG. 2 is an oblique view of a rotor unit.

The configuration of the rotor unit 5 will be described next with reference to FIG. 2 and FIG. 4. As shown in FIG. 2, a rotor yoke 6 comprises a magnetic material and is formed into a cup shape, and a lightening hole 6a where a centre portion has been lightened is formed therein (see FIG. 4). An annular rotor magnet 7 is provided on an inner circumferential surface of the rotor yoke 6. The rotor magnet 7 is magnetized in such a way that N poles and S poles are alternately formed in a circumferential direction.

Furthermore, as shown in FIG. 4, the cup-shaped magnetic metal material of the rotor yoke 6 which is formed with the lightening hole 6a in the centre portion thereof to reduce the metal areas as far as possible is insert-moulded using a second resin material having good wear resistance and slideability, e.g., an engineering plastic resin material (POM: polyacetal resin, etc.), whereby a rotor hub 8, including a motor gear wheel 8c which will be described later, is integrally moulded. The rotor hub 8 extends as a single piece in the axial direction on an inner surface side and an outer surface side of the rotor yoke 6 through the lightening hole 6a.

Figure 6:
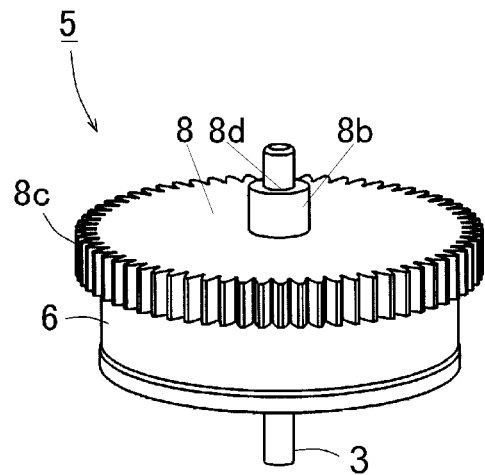
FIG. 6 is an oblique view of a rotor unit according to another example.

As shown in FIG. 4, the rotor hub 8 is integrally moulded in a cylindrical shape in a central portion of the rotor yoke 6, and comprises an inside cylindrical portion 8a extending in the axial direction on the inner surface side of the rotor yoke 6, and an outside cylindrical portion 8b extending in the axial direction on the outer surface side of the rotor yoke 6. The motor gear wheel 8c is integrally moulded on a cylinder end portion of the outside cylindrical portion 8b. It should be noted that the motor gear wheel 8c need not necessarily be provided on the cylinder end portion of the outside cylindrical portion 8b, and it is equally possible for the motor gear wheel 8c to be integrally moulded with the rotor hub 8 on a portion of the outside cylindrical portion 8b on an axial outer surface side of the rotor yoke 6, as shown in FIG. 6, for example.

Figure 7:
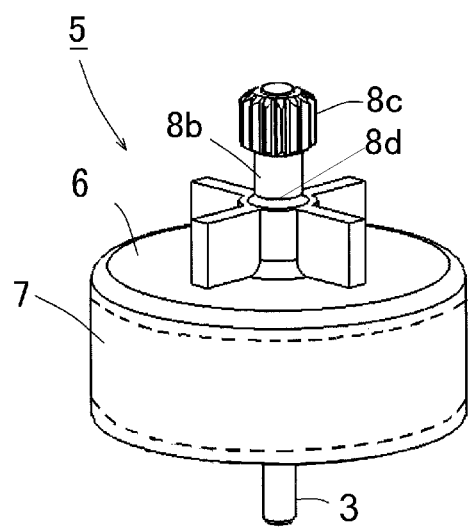
FIG. 7 is an oblique view of a rotor unit according to another example.

In the rotor unit 5, at least the rotor hub 8 with which the motor gear wheel 8c is integrally moulded should be formed from a resin material, and the rotor hub 8 also including a cup-shaped rotor yoke 6 may be integrally moulded using an engineering plastic resin material, for example, as shown in FIG. 7. In this case, the annular rotor magnet 7 is insert-moulded on the inner circumferential surface of the cup-shaped rotor yoke 6 and assembled as a single piece therewith.

Figure 3:
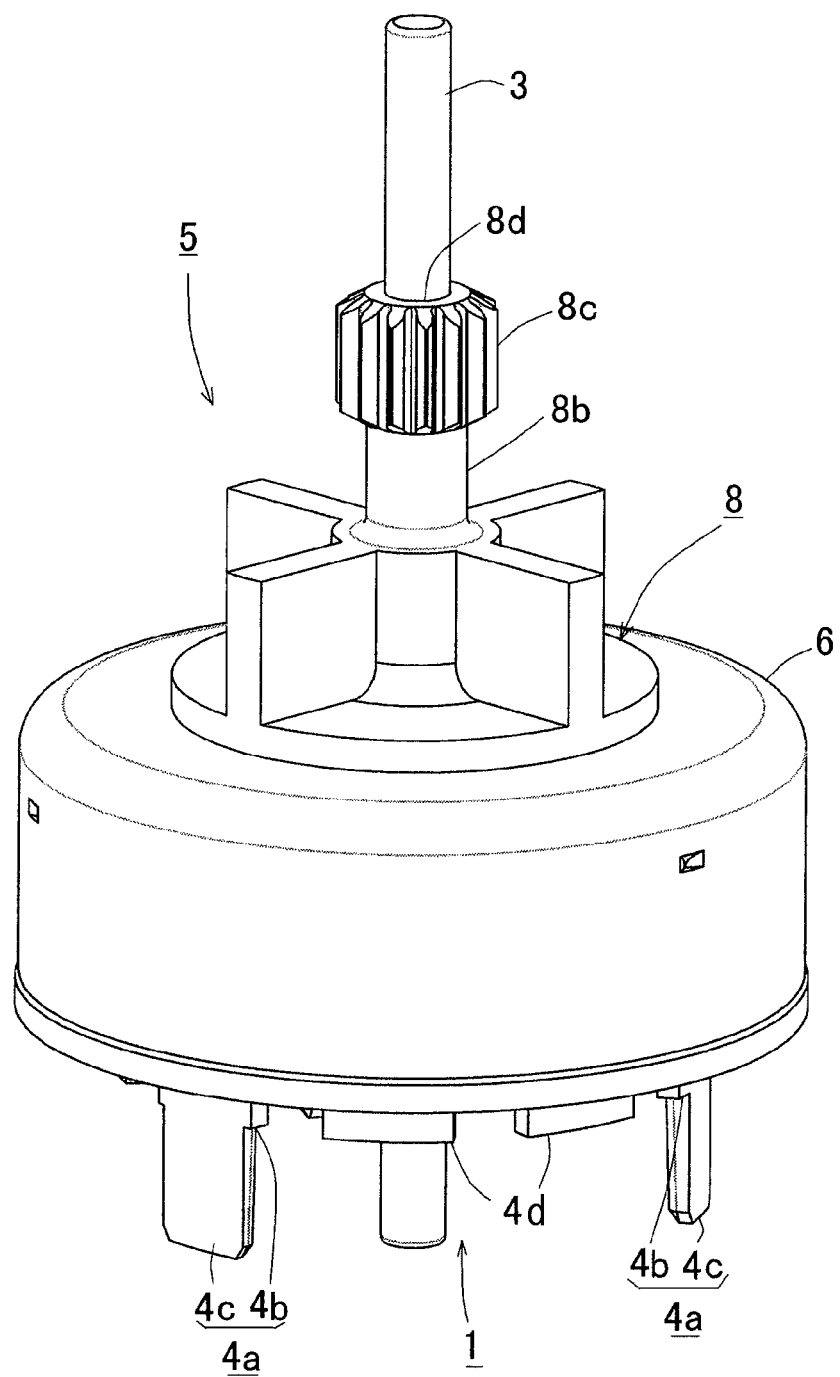
FIG. 3 is an oblique view of an outer rotor type motor.

As shown in FIG. 3, the rotor unit 5 is assembled with the stator unit 1 in such a way that the fixed shaft 3 is inserted into a cylindrical hole 8d in the cylindrical rotor hub 8 and the rotor magnet 7 and the pole teeth 2b are facing, said rotor unit 5 being assembled in such a way as to be slidable and rotatable about the fixed shaft 3. Specifically, the rotor unit 5 is assembled with the stator unit 1 by inserting the inside cylindrical portion 8a of the rotor hub 8 into the centre hole 2c at the other axial end of the core back portion 2a so that the cylinder end portion butts against the insulator 4.

As a result, it is possible to lengthen an axial distance D between load support points (see FIG. 4) from the motor gear wheel 8c by increasing the axial length of the inside cylindrical portion 8a of the rotor hub 8, and it is also possible to lengthen the axial distance D between load support points (see FIG. 4) from the inside cylindrical portion 8a of the rotor hub 8 to the motor gear wheel 8c by providing the motor gear wheel 8c on the cylinder end portion of the outside cylindrical portion 8b of the rotor hub 8. It is therefore possible to maintain the withstand load performance of the motor in relation to external loads, and the lifespan.

As described above, it is possible to reduce the number of components as far as possible and to reduce production costs by employing a resin to form the constituent components of a motor in which metal components are normally used for a bearing, a bearing housing, an attachment plate, and a motor gear wheel, etc.

Furthermore, the stator core 2 is integrally moulded with the insulator 4 employing the insulating resin material, together with the fixed shaft 3 which has been inserted into the centre hole 2c in the core back portion 2a, and as a result it is possible to maintain motor performance without a reduction in axial perpendicularity of the fixed shaft 3 with which the stator core 2 and the rotor unit 5 are assembled.

It is possible to maintain motor performance without a reduction in axial perpendicularity of the stator core 2 and the circuit board 9 by assembling the stator core 2 as a single piece with the circuit board 9, by mating the plurality of circuit board insertion pieces 4a protruding on the axial end of the insulator 4 on the opposite side to the output end with the circuit board insertion holes 9a.

Additionally, the rotor unit 5 and the stator unit 1 are insert-moulded using the most suitable resin, thereby making it possible to inexpensively provide an outer rotor type motor which has fewer constituent components and is easy to assemble.

It should be noted that the motor gear wheel 8c need not necessarily be formed as a single piece with the rotor hub 8 in the outer rotor type motor.

What is claimed is:

1. Outer rotor type motor in which a rotor is rotatably assembled radially outside of a stator, said outer rotor type motor being characterized in that it comprises:

a stator unit having a stator core comprising a plurality of pole teeth protruding radially outside of a core back portion formed in an annular shape, an insulator with which a fixed shaft inserted into a centre hole in the core back portion is insert-moulded by means of a first resin material covering the stator core, and a circuit board electrically connected to a magnet wire assembled and wound on the pole teeth with the insulator interposed; and a rotor unit having a rotor yoke formed into a cup shape with a lightening hole formed in a centre portion and an annular rotor magnet provided on an inner circumferential surface of the rotor yoke, a rotor hub formed with an inside cylindrical portion that extends as a single piece from the rotor hub, where the rotor hub is insert-moulded to the rotor yoke using a second resin material, and the stator core is assembled as a single piece with the circuit board by mating a plurality of circuit board insertion pieces protruding on an axial end of the insulator on the opposite side to an output end of the insulator which are inserted into circuit board insertion holes, the plurality of circuit board insertion pieces include stepped portions that butt against an insertion surface side of the circuit board and circuit board fixing portions whereof tip end portions extend up to the opposite surface side of the circuit board and are fixed, and the stator unit and the rotor unit are assembled in such a way that the fixed shaft is inserted into a cylindrical hole in the rotor hub, the inside cylindrical portion is inserted into the centre hole of the core back portion of the stator core and butts against the insulator, and the rotor magnet and the pole teeth are facing each other, said rotor unit being assembled in such a way as to be slidable and rotatable about the fixed shaft.

2. Outer rotor type motor according to claim 1, wherein the circuit board insertion pieces are provided on the insulator correspondingly with the pole teeth of the stator core, and support legs which abut the circuit board and provide support are provided correspondingly with the pole teeth between the circuit board insertion pieces.

* * * * *